(12) United States Patent
Kwon et al.

(10) Patent No.: US 9,061,567 B2
(45) Date of Patent: Jun. 23, 2015

(54) AIR-CONDITIONING CONTROL METHOD FOR VEHICLE

(71) Applicant: Hyundai Motor Company, Seoul (KR)

(72) Inventors: Jung Ho Kwon, Hwaseong-si (KR);
Chun Kyu Kwon, Hwaseong-si (KR);
Young Rok Lee, Hwaseong-si (KR);
Dong Hyun Kong, Hwaseong-si (KR);
Tae Woong Lim, Hwaseong-si (KR);
Chang Won Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 217 days.

(21) Appl. No.: 13/673,790

(22) Filed: Nov. 9, 2012

(65) Prior Publication Data
US 2013/0325259 A1   Dec. 5, 2013

(30) Foreign Application Priority Data
Jun. 4, 2012  (KR) .................. 10-2012-0059598

(51) Int. Cl.
*B60H 1/00*   (2006.01)

(52) U.S. Cl.
CPC .............. *B60H 1/00642* (2013.01); *B60H 1/00* (2013.01); *B60H 1/00742* (2013.01); *B60H 1/00828* (2013.01); *B60H 1/00842* (2013.01)

(58) Field of Classification Search
CPC ...................................................... B60H 1/00
See application file for complete search history.

(56) References Cited

FOREIGN PATENT DOCUMENTS

| JP | 10-6734 A | 1/1998 |
|---|---|---|
| KR | 10-2009-0027976 A | 3/2009 |
| KR | 10-2012-0023409 A | 3/2012 |
| KR | 10-1146887 B1 | 5/2012 |

OTHER PUBLICATIONS

Machine Translation of KR 10-2009-0027976 (Nov. 9, 2012).*
Machine Translation of JP 10-6734 (Nov. 9, 2012).*

* cited by examiner

*Primary Examiner* — John Q Nguyen
*Assistant Examiner* — Michael Kerrigan
(74) *Attorney, Agent, or Firm* — Morgan, Lewis & Bockius LLP

(57) ABSTRACT

An air-conditioning control method for dividing an indoor space of a vehicle into a plurality of zones to perform individual air-conditioning for each zone, may include selecting boarding zones occupied by passengers from the plurality of zones, checking whether the number of the boarding zones occupied by the passengers may be one, correcting a detection temperature of an incar sensor into a temperature of the boarding zone using a mixing ratio of air for air-conditioning discharged from the corresponding boarding zone with air existing in the boarding zone when the number of the boarding zones occupied by the passengers may be one, and performing individual air-conditioning on the selected boarding zones by determining a target discharge temperature based on the corrected temperature of the boarding zone and using the determined target discharge temperature.

12 Claims, 6 Drawing Sheets

AIR-CONDITIONING CONTROL METHOD FOR VEHICLE

CROSS-REFERENCE TO RELATED APPLICATION

The present application claims priority to Korean Patent Application No. 10-2012-0059598 filed Jun. 4, 2012, the entire contents of which is incorporated herein for all purposes by this reference.

BACKGROUND OF THE INVENTION

1. Field of the Invention

The present invention relates to an air-conditioning control method for a vehicle. More particularly, the present invention relates to an air-conditioning control method for a vehicle, which can increase the driving distance of electric vehicles by reducing the consumption of energy spent in unnecessary air-conditioning for indoor spaces except spaces occupied by passengers.

2. Description of Related Art

Generally, vehicles are equipped with Heating, Ventilation, and Air-conditioning (HVAC) apparatuses used for controlling the indoor temperature of vehicles and making the indoor environment of vehicles more comfortable.

Recently manufactured vehicles include a Full Automatic Temperature System (FATC) that can automatically control the indoor temperature in accordance with a temperature set by a driver or a passenger and maintains the indoor environment comfortable.

In the FATC system, when a user sets a temperature, in order to control the indoor temperature, an air-conditioning controller (FATC controller) receives sensor detection signals from an insolation sensor for detecting the quantity of solar radiation, an outcar sensor for detecting the outdoor temperature, and an incar sensor for detecting the indoor temperature of a vehicle to calculate an indoor heat load based on the detection values of each sensor and determine a discharge mode, a discharge temperature, a discharge direction, and a discharge air volume in consideration of an air-conditioning load corresponding to the heat load.

Also, in order to control the indoor temperature and the system operation, the air-conditioning controller receives detection values from a discharge temperature sensor for detecting the discharge temperature, a heater temperature sensor for detecting the temperature of an electric heater (e.g., PTC heater; used as an auxiliary heater in internal combustion engine vehicles and as a main heater in electric vehicles), and an evaporator temperature sensor for detecting the temperature of an evaporator, and controls operation components such as a mode actuator, a temp door (temperature controlling door) actuator, an air direction controlling door actuator, an air-conditioning blower, a compressor, and an electric heat, using the discharge mode, the discharge temperature, the discharge direction, and the discharge air volume determined as above.

Due to the increase of oil price and the strengthening of environmental regulation, recent attention in the development of vehicles is being paid to improvement of the fuel efficiency and eco-friendliness. Endeavors to develop pollution-free and eco-friendly Electric Vehicles (EV) that use an electric motor as a driving source are being extensively made.

Electric vehicles are equipped with an electric motor for driving the vehicle and a battery that is an energy storage as a power source for supplying power to the electric motor.

Also, since electric vehicles have no typical engine that serves as a source for heating and a source for driving a compressor unlike internal combustion engine vehicles, electric vehicles have to use an electric heater and an electric compressor. In this case, the consumption of power due to actuation of an air-conditioning apparatus has a great influence on deterioration of the fuel efficiency.

Due to the consumption of battery power, the driving distance (hereinafter, driving distance per charging) of a vehicle can be reduced by a maximum of 50%, compared to a case where the air-conditioning apparatus is not actuated. In a case where a high voltage electric heater has to be actuated for heating, the consumption of the battery power rapidly increases, and thus the driving distance significantly decreases (relatively deficient in a waste heat source unlike internal combustion engine vehicles using engine waste heat).

Accordingly, the technological development for a high efficiency air-conditioning apparatus differentiated for electric vehicles is an essential factor for promotion of the distribution of electric vehicles. Also, the technological development that can minimize the power consumption while providing and maintaining a comfort desired by a driver or a passenger as much as possible when the air-conditioning apparatus is actuated is needed.

For this, various endeavors to develop heat pump systems, high-efficiency heat-insulating technologies, glass heat-shielding and heat-insulating technologies, remote reservation air-conditioning and indoor/outdoor air controlling technologies are being actively made, but there are many limitations in cost saving and commercialization.

Particularly, the technological development for reducing unnecessary energy consumption upon actuation of the air-conditioning apparatus in a vehicle has to be together carried out. However, since the air-conditioning apparatus is actuated for the whole indoor space of a vehicle regardless of whether a passenger occupies a certain indoor space of the vehicle, unnecessary energy consumption is inevitable.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air-conditioning control method for a vehicle, which can increase the driving distance of electric vehicles by reducing the consumption of energy spent in unnecessary air-conditioning for indoor spaces except spaces occupied by passengers while providing and maintaining a comfort desired by a driver or a passenger as much as possible.

In one aspect, the present invention provides an air-conditioning control method for dividing an indoor space of a vehicle into a plurality of zones to perform individual air-conditioning for each zone, the method including selecting boarding zones occupied by passengers from the plurality of zones, checking whether the number of the boarding zones occupied by the passengers is one, correcting a detection temperature of an incar sensor into a temperature of the boarding zone using a mixing ratio of air for air-conditioning discharged from the corresponding boarding zone with air existing in the boarding zone when the number of the boarding zones occupied by the passengers is one, and performing individual air-conditioning on the selected boarding zones by calculating a target discharge temperature based on the corrected temperature of the boarding zone and using the calculated target discharge temperature.

In an exemplary embodiment, when a difference between the detection temperature of the incar sensor and an air-conditioning setting temperature set by a user is smaller than a predetermined reference value, the correcting of the detection temperature of the incar sensor and the performing of the individual air-conditioning may be performed.

In another exemplary embodiment, the difference between the detection temperature of the incar sensor and the air-conditioning setting temperature is equal to or greater than the reference value, a target discharge temperature may be calculated using the detection temperature of the incar sensor, and the performing of the individual air-conditioning may be performed using the target discharge temperature determined from the detection temperature of the incar sensor.

In still another exemplary embodiment, when the selected boarding zones may include a rear seat in addition to one of a driver' seat and a passenger's seat in a first row boarding zone, the method may further may include correcting the detection temperature of the incar sensor into a temperature of the boarding zone using a mixing ratio of the first row boarding zone, and performing air-conditioning on the selected boarding zones by calculating a target discharge temperature based on the corrected temperature of the boarding zone using the mixing ratio of the first row boarding zone and using the calculated target discharge temperature.

In yet another exemplary embodiment, when a difference between the detection temperature of the incar sensor and an air-conditioning setting temperature set by a user is smaller than a predetermined reference value, the correcting of the detection temperature of the incar sensor using the mixing ratio of the first row boarding zone and the performing of air-conditioning on the selected boarding zones may be performed.

In still yet another exemplary embodiment, when the difference between the detection temperature of the incar sensor and the air-conditioning setting temperature is equal to or greater than the reference value, the target discharge temperature may be calculated using the detection temperature of the incar sensor, and the air-conditioning on the boarding zone may be performed using the target discharge temperature determined from the detection temperature of the incar sensor.

In a further exemplary embodiment, when the selected boarding zones are all in the first row, the target discharge temperature may be calculated using the detection temperature of the incar sensor, and the air-conditioning on the boarding zone may be performed using the target discharge temperature determined from the detection temperature of the incar sensor.

In another further exemplary embodiment, the corrected temperature of the boarding zone may be calculated from the detection temperature of the incar sensor, the air-conditioning setting temperature set by a user, and a mixing efficiency through Equation (1) below $$T_{ZONE}=T_{INCAR}+(T_{SET}-T_{INCAR})\times \eta_{x,ZONE} \quad (1)$$

where $T_{ZONE}$, $T_{INCAR}$, $T_{SET}$, and $\eta_{x,ZONE}$ denote the corrected temperature (temperature of boarding zone used in actual air-conditioning) of the boarding zone, the detection temperature of the incar sensor, the setting temperature, and the mixing efficiency, respectively.

In still another further exemplary embodiment, the mixing efficiency may be defined as a value according to a discharge mode and a discharge air volume for each zone.

In yet another further exemplary embodiment, when the whole zone of the indoor space of the vehicle is the boarding zone occupied by passengers, the method may further may include performing air-conditioning on the whole boarding zone by calculating a target discharge temperature using the detection temperature of the incar sensor and using the target discharge temperature determined from the detection temperature of the incar sensor.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
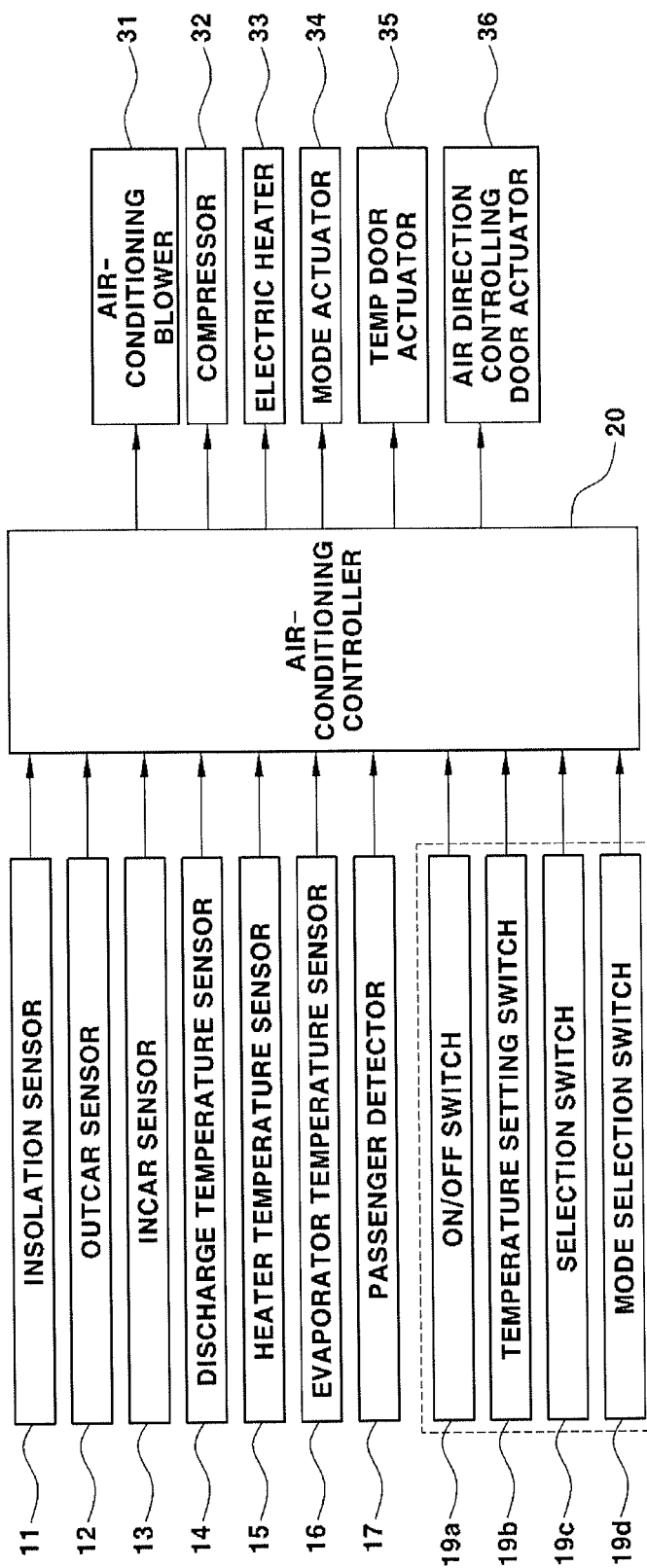
FIG. 1 is a view illustrating a configuration of an air-conditioning apparatus performing an air-conditioning process according to an exemplary embodiment of the present invention.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

The present invention relates to a new air-conditioning control method that can significantly increase the driving distance that is a core performance for distribution of electric vehicle by reducing the consumption of energy spent in unnecessary air-conditioning for indoor spaces except spaces occupied by passengers in electric vehicles.

Also, the present invention relates to an air-conditioning control method for increasing the driving distance of electric vehicles by reducing unnecessary power consumption of a battery upon actuation of an air-conditioning apparatus in electric vehicles, which can applied to an air-conditioning apparatus that can be independently controlled for each zone according to the temperature, direction and volume of air for heating and cooling discharged into the interior of vehicles.

Particularly, the present invention focuses on a point that individual air-conditioning is performed on the indoor space of a vehicle that is divided into a plurality of zones, and the air-conditioning apparatus is actuated only on zones that passengers are actually occupying to maintain a desired temperature while reducing unnecessary power consumption of a battery.

Unlike a typical air-conditioning technology for vehicles in which unnecessary energy consumption occurs because the air-conditioning apparatus is actuated for the whole interior of a vehicle, the present invention includes performing air-conditioning only on zones actually occupied by passengers, and for the individual air-conditioning for each zone, includes a process of recognizing the boarding locations of passengers and a process of controlling the temperature of zones occupied by passengers.

Here, zones denote individual boarding spaces such as driver zone, passenger zone, and rear zone into which the indoor space of a vehicle is divided in advance for individual air-conditioning for each zone.

Hereinafter, an air-conditioning control method according to an exemplary embodiment of the present invention will be described in detail with reference to the accompanying drawings.

Figure 2:
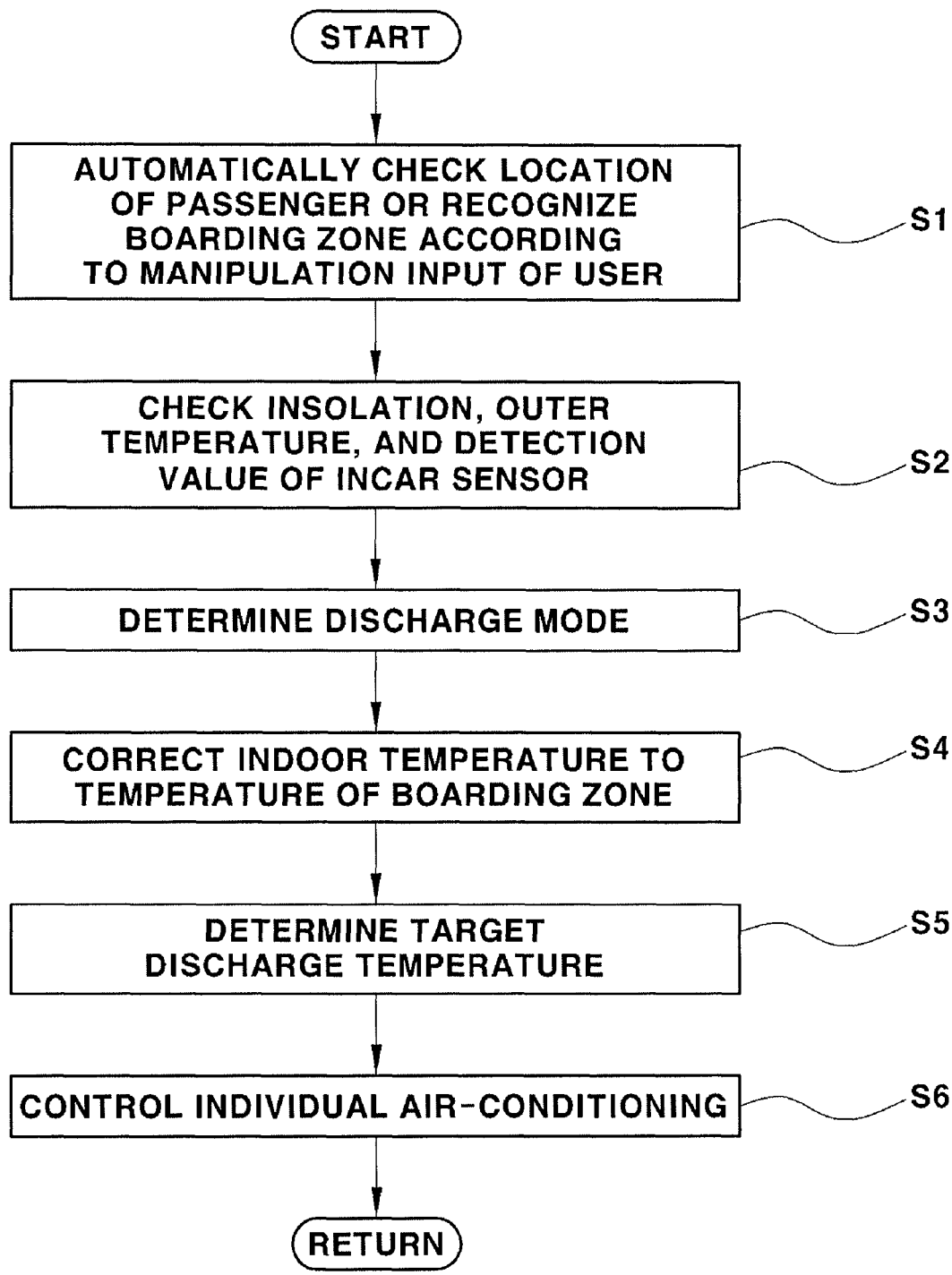
FIG. 2 is a flowchart illustrating an air-conditioning process according to an exemplary embodiment of the present invention.

FIG. 1 is a view illustrating a configuration of an air-conditioning apparatus performing an air-conditioning process according to an exemplary embodiment of the present invention. FIG. 2 is a flowchart illustrating an air-conditioning process according to an exemplary embodiment of the present invention.

Figure 3:
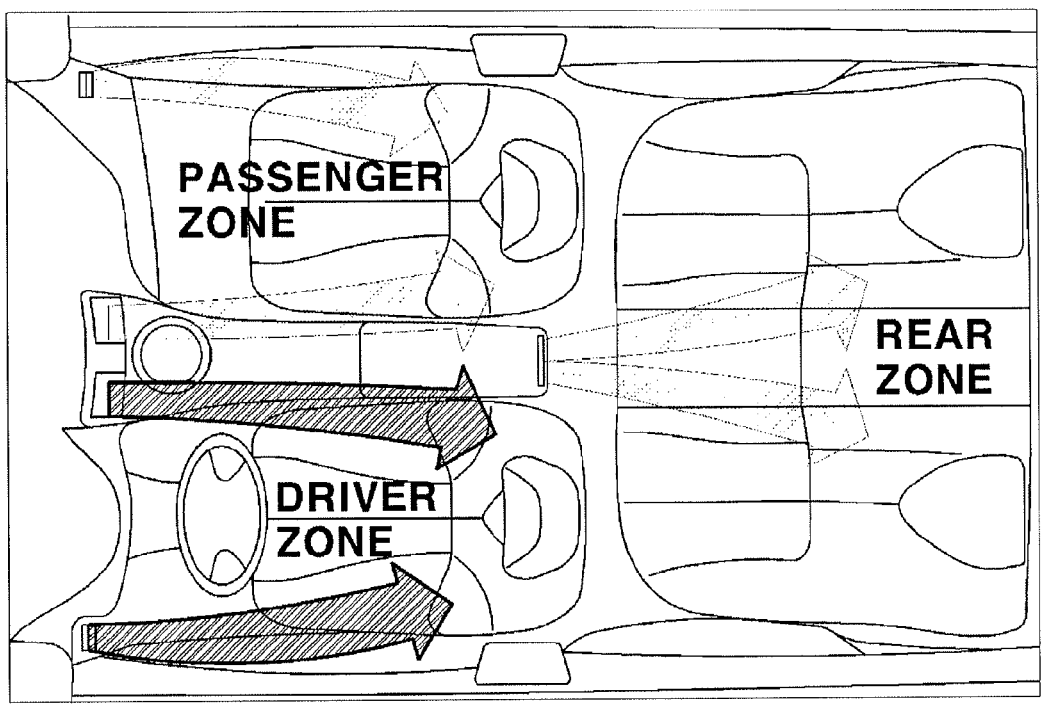
FIG. 3 is a view illustrating an exemplary three-zone individual air-conditioning method according to an exemplary embodiment of the present invention.

FIG. 3 is a view illustrating an exemplary three-zone individual air-conditioning method according to an exemplary embodiment of the present invention. Here, the indoor space of a vehicle may be divided into three zones such as a driver zone, a passenger zone, and a rear zone. FIG. 3 illustrates an air-conditioning method in which independent air-conditioning control is performed on the temperature, the direction and the volume of air for heating and cooling (air for air-conditioning) of each zone.

Referring to FIG. 3, the interior of a vehicle may be divided into three zones, i.e., a driver zone, a passenger zone, and a rear zone that are preset for individual air-conditioning by zone. Also, an incar sensor 13 may be disposed in the interior of the vehicle to detect the temperature.

In the three-zone individual air-conditioning method of FIG. 3, as shown in FIG. 2, a user (driver or passenger) turns on an on/off switch 19a in a control panel 18 (air-conditioning apparatus turned on), and then sets an air-conditioning target temperature, i.e., a certain temperature via a temperature set switch 19b of the control panel 18, an air-conditioning controller 20 may determine a zone occupied by a passenger (S1) and also calculate a heat load of the vehicle interior based on the indoor temperature, the insolation, and the outdoor temperature of a vehicle, and then may determine a discharge mode and a discharge air volume (air volume of an air-conditioning blower) in consideration of an air-conditioning load corresponding to the heat load.

Here, the air-conditioning controller 20 may receive a detection value of a passenger detector 17, and may automatically determine a zone (zone subject to air-conditioning among the indoor space of the vehicle, hereinafter, referred as 'boarding zone') occupied by a passenger according to a passenger location automatic check logic (automatic recognition of the boarding zone), or may receive the manipulation state of a selection switch 19c in the control panel 18, and then recognize the boarding zone subject to the air-conditioning (manual input of the boarding zone by a user)

In the case of the manual input, the boarding zone may be a seat that needs air-condition, i.e., a zone selected by a user because a user deems the seat occupied by a passenger, but may not means all seats that are actually occupied by passengers. Also, the selection switch 19c may be a switch for manual setting and input of the boarding zone.

The passenger detector 17 may be a component for detecting whether each seat of a vehicle is occupied by a driver or a passenger, and may include piezoelectric sensors disposed in each seat. In this case, the piezoelectric sensor may be disposed at positions that are pressed when a driver or a passenger sits on the seat. For example, the piezoelectric sensor may be disposed at the seat cushions of a driver's seat, a passenger's seat, and a rear seat.

When a driver or a passenger sits on a seat, the piezoelectric sensor in the seat may output electrical signals to the air-conditioning controller 20. When a driver or a passenger sits on a seat cushion (seat cushions of driver's seat, passenger's seat, and rear seat), the piezoelectric sensor may output electrical signals by a physical pressure applied to the seat cushion, and the air-conditioning controller 20 may receive the electrical signals to detect whether each seat is occupied by passengers.

The passenger detector 17 will not be limited to a specific type of unit. For example, instead of the piezoelectric sensor, the passenger detector 17 may include one of various types of well-known units as long as it can detect whether a passenger sits on the driver's seat, the passenger's seat, or the rear seat.

When a driver's seat or a passenger's seat is occupied, the air-conditioning controller 20 receiving signals of the passenger detector 17 may automatically recognize the driver's seat or the passenger's seat as a boarding zone. When a rear seat is occupied, the air-conditioning controller 20 may automatically recognize the driver's seat or the passenger's seat as a boarding zone by signals of the passenger detector 17.

The discharge mode selected upon actuation of the air-conditioning apparatus may be one of a mode group including a face mode (also referred to as vent mode), a floor mode, and a bi-level mode, which are divided by an air discharging method. For actuation of each mode, the air-conditioning apparatus may include a mode door that changes an air flow path (control of air direction) and an actuator thereof (mode actuator) 34.

In this case, examples of vents of the air-conditioning apparatus that are divided by discharge mode may include a face vent that allows air to be discharged to the face and the chest of a passenger at a location of each zone of the vehicle interior and a floor vent that allows air to be discharged to the floor and the foot of a driver (or a passenger sitting on the passenger's seat). Here, each vent may be divergently connected to ducts for supplying air.

The face mode and the floor mode may discharge air for air-conditioning through the face vent and the floor vent. The bi-level mode may discharge air for air-conditioning through the face vent and the floor vent. After the determination of the discharge mode, the air-conditioning controller 20 may drive a mode actuator 34 and control the location of a mode door such that air for air-conditioning can be supplied and discharged in each discharge direction.

The discharge mode may be automatically determined according to the air-conditioning load corresponding to the heat load. However, when a driver or a passenger manipulates the mode selection switch 19d of the control panel 18, the air-conditioning controller 20 may receive the manipulation state of the mode selection switch 19d to determine the discharge mode as a mode selected via the mode selection switch 19d.

Since the determination process of the discharge mode and the control and actuation of the air-conditioning apparatus according to the discharge mode correspond to well-known technical matters that are currently being applied to the air-conditioning of vehicles, a detailed description thereof will be omitted herein.

After the discharge mode and the discharge air volume are determined, the target discharge temperature of the air-conditioning apparatus may be determined based on the indoor temperature, the heat load, and the air-conditioning setting temperature set by a driver or a passenger (S5). Based on the target discharge temperature, the actuation of the air-conditioning apparatus such as the air-conditioning blower 31, the compressor 32, the electric heater 33 (e.g., PTC heater), the temp door actuator 35, and the air direction controlling door actuator 36 may be controlled (S6).

The air direction controlling door actuator 36 may be driven according to whether each zone is occupied by a passenger to control the location of an air direction controlling door 6. In this case, Air for air-conditioning may be supplied only to boarding zones (boarding zones automatically recognized or manually selected), i.e., zones occupied by a driver or passengers.

Figure 4:
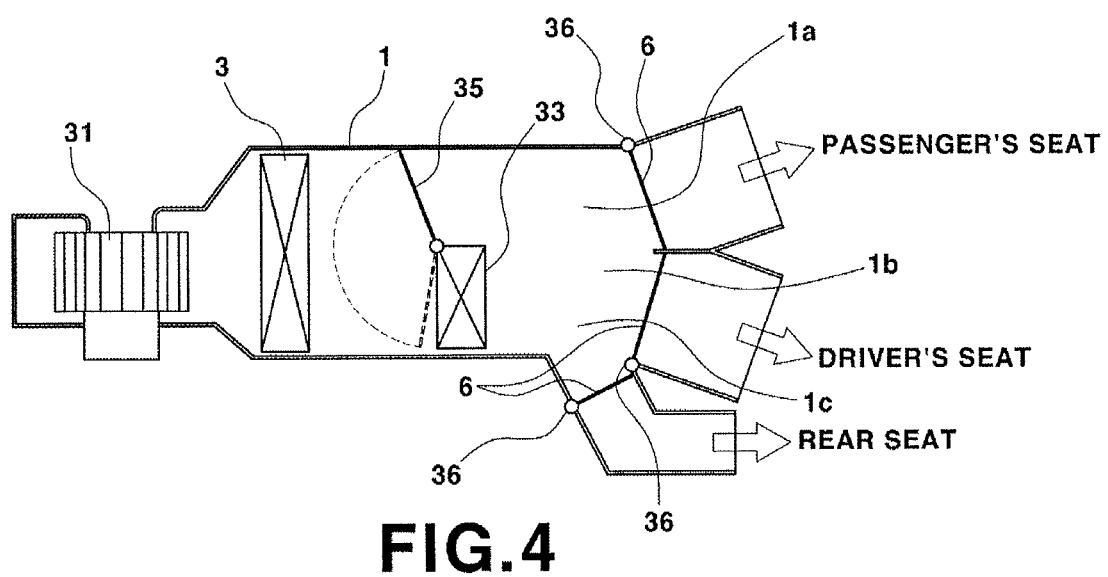
FIG. 4 is a view illustrating an exemplary configuration of an air-conditioning apparatus that performs an air-conditioning process to supply air for heating and cooling to a selected zone according to an exemplary embodiment of the present invention.

An exemplary configuration for controlling the discharge air direction, in which air for air-conditioning is supplied only to selected boarding zones, is shown in FIG. 4. As shown in FIG. 4, branched ducts 1a, 1b and 1c branched from an air-conditioning duct 1 equipped with an evaporator 3 and an electric heater 33 and connected to locations of each zone, the air direction controlling door 6 for controlling the air direction of air for air-conditioning and the distribution amount to each of branched ducts 1a, 1b and 1c, and an actuator 36 thereof may be provided.

The reference numeral 35 of FIG. 4 indicates a temp door for controlling the temperature of air for air-conditioning and an actuator thereof, respectively.

When the temperature of the boarding zone is controlled by selectively supplying air for air-conditioning only to the boarding zone, the air-conditioning controller 20 may control the air volume of air for air-conditioning by controlling a supply voltage (number of rotation) for driving of an air-conditioning blower 31 according to the discharge air volume determined as above.

The air-conditioning controller 20 may receive detection values of a discharge temperature sensor 14 for detecting the discharge temperature, a heater temperature sensor 15 for detecting the temperature of the electric heater 33, and an evaporator temperature sensor 16 for detecting the temperature of the evaporator 3, and may control the actuation of the air-conditioning apparatus such that the actual discharge temperature of air for air-conditioning keeps up with the target discharge temperature of the boarding zone.

Except that air for air-conditioning is supplied to a boarding zone selected by a passenger, since the process of controlling the discharge temperature and the actuation of the air-conditioning apparatus to keep up with the target discharge temperature corresponds to a well-known technical matter that is currently being applied to the air-conditioning for vehicles, a more detailed description thereof will be omitted herein.

The air-conditioning control method according to the exemplary embodiment of the present invention is characterized in that after the air-conditioning controller determines the boarding zone, i.e., zones occupied by passengers, the air-conditioning apparatus is actuated such that the indoor temperature can be controlled with respect to the boarding zone.

Thus, when air-conditioning for each zone, which targets only spaces actually occupied by passengers, is performed, unnecessary energy consumption can be minimized, and thus the driving distance of electric vehicles can be significantly increased, compared to a typical air-conditioning for vehicles in which the air-conditioning apparatus is actuated for the whole indoor space.

Also, when the heat load is calculated and the discharge mode and the discharge air volume are determined based on the detection values of the insolation sensor 11, the outcar sensor 12, and the incar sensor 13, the air-conditioning controller 20 may calculate the target discharge temperature for each zone by correcting the detection value of the incar sensor 13 (S4 of FIG. 2) to use the corrected value as the temperature of the corresponding zone according to whether each zone is occupied by a passenger instead of using the detection value of the incar sensor 13 as the indoor temperature without a change.

Thus, when the indoor temperature (temperature of a selected boarding zone) is calculated by correcting the detection value of the incar sensor 13, the target discharge temperature of the corresponding boarding zone may be calculated using the indoor temperature obtained by the correction, and then individual air-conditioning that controls the actuation of the air-conditioning apparatus with respect to the boarding zone may be performed based on the calculated target discharge temperature.

Here, the temperature of the boarding zone (zone occupied by a passenger) obtained by correcting the detection value of the incar sensor 13 may be determined according to whether each divided zone (driver's seat, passenger's seat, and rear seat) of the indoor space of a vehicle is occupied by a passenger or is selected as a boarding zone. The correcting of the detection value of the incar sensor 13 according to whether each zone is occupied by a passenger may be for using only one incar sensor 13, which will be described in more detail below.

In order to control the temperature of the whole indoor space of a vehicle in a related art, a detection value of the incar sensor is used without a change to calculate a target discharge temperature, and it is checked whether the temperature of the whole indoor space is controlled to a temperature desired by a driver.

However, when the indoor space is divided to perform the individual air-conditioning, the temperature of each zone actually occupied by a passenger has to be controlled instead of the temperature of the whole indoor space. Accordingly, a feedback for the temperature of each zone may be needed.

For an accurate feedback for the temperature of each zone, incar sensors may be disposed at each zone that is divided into a driver's seat, a passenger's seat, and a rear seat. However, when incar sensors are disposed at all zones, the temperature of each zone may not be represented according to the attachment location of the sensor due to the layout of a vehicle, and the manufacturing cost may also increase.

Accordingly, as shown in FIG. 3, the incar sensor 13 may be disposed only at the central part of the first row (driver's seat and passenger's seat), and upon individual air-conditioning, the detection value of the incar sensor 13 may be corrected such that the temperature of each zone can be reflected according to the location of passengers.

For example, when the indoor space of a vehicle is divided into two or more zones, and air-conditioning is performed according to whether each zone is occupied by a passenger, the detection value of the incar sensor 13 may be corrected such that the temperature of each zone selected can be accurately controlled using only one incar sensor 13. In this case, the detection value of the incar sensor 13 may be corrected according to the boarding location of a passenger (whether each zone is occupied by a passenger) or zones selected by a user to control the temperature.

Figure 5:
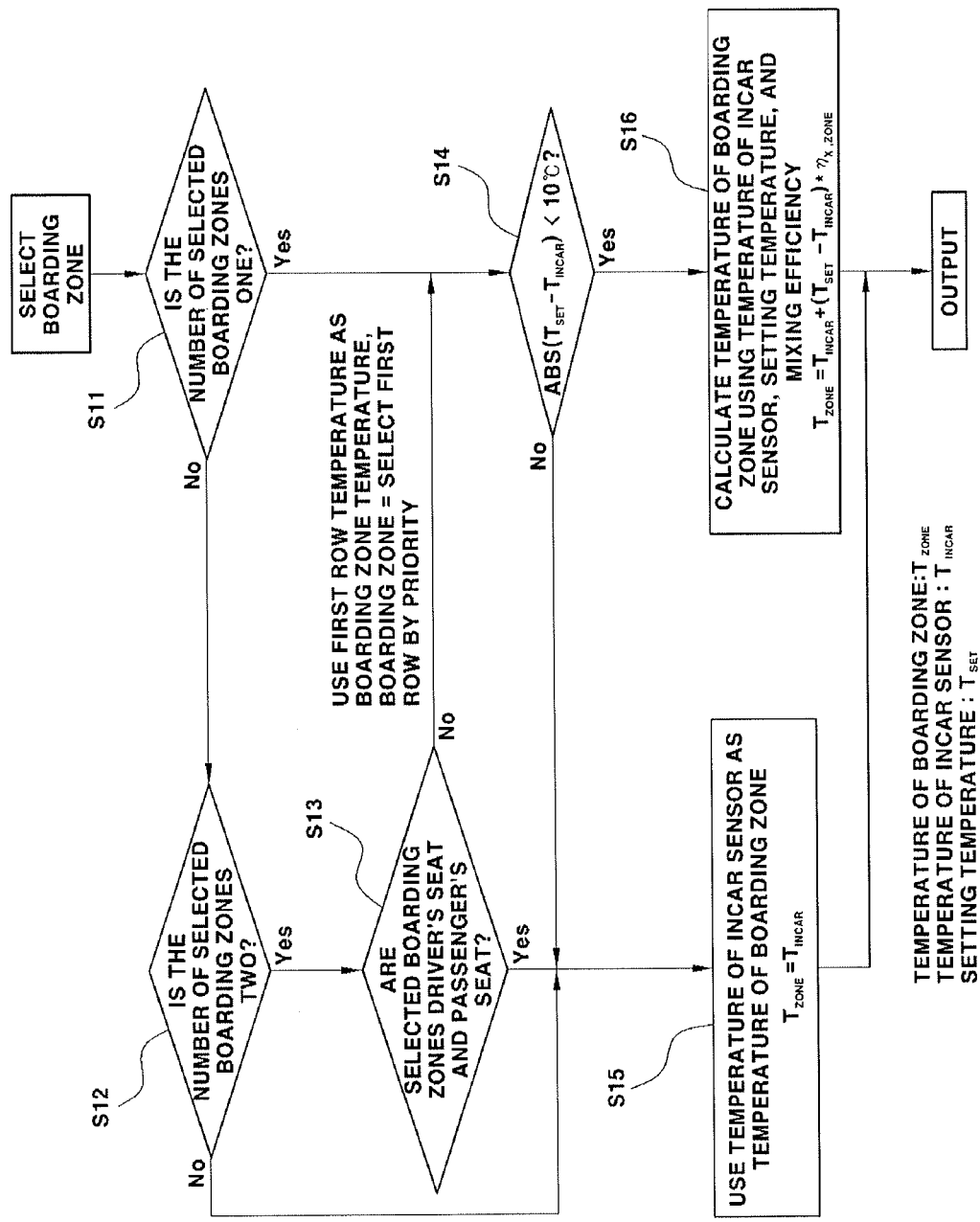
FIG. 5 is a flowchart illustrating a process of performing a temperature correction according to a boarding zone in an air-conditioning process according to an exemplary embodiment of the present invention.

FIG. 5 is a flowchart illustrating a process of performing a temperature correction according to a boarding zone in an air-conditioning process according to an exemplary embodiment of the present invention. Hereinafter, a method of calculating the temperature to be applied to a selected boarding zone by correcting the detection temperature of the incar sensor in order to control the temperature of the selected boarding zone will be described with reference to FIG. 5.

As describe above, the present invention may include a process of correcting the temperature to use only one incar sensor when individual air-conditioning is performed on a selected boarding zone occupied by a passenger.

First, a boarding zone occupied by a passenger may be automatically recognized by the passenger detector 17 via a passenger location automatic check logic, or may be selected by a user via the selection switch 19c.

When the boarding zones on which air-condition is to be performed are selected, the air-conditioning controller 20 may check the number of the selected boarding zones in step S11 of FIG. 5. When the number of the selected zones is one, the detection temperature of the incar sensor 13 may be compared with the air-conditioning setting temperature to check whether a difference therebetween is equal to or greater than a predetermined reference value (e.g., 10° C.) (S14).

If the difference between the detection temperature and the setting temperature is equal to or greater than the reference value, this corresponds to a case where indoor heating or cooling is needed. In this case, the detection temperature of the incar sensor may be used as the temperature of the boarding zone without a temperature correction to control the actuation of the air-conditioning apparatus (S15).

In addition to the amount of solar radiation and the outer temperature, the air-conditioning controller may use the detection temperature of the incar sensor to calculate the target discharge temperature, and may perform individual air-conditioning control on the selected boarding zone based on the calculated target discharge temperature. As described above, the air-conditioning controller may control the actuation of the air-conditioning apparatus such that the discharge temperature of the corresponding boarding zone keeps up with the target discharge temperature.

However, if the difference between the detection temperature of the incar sensor and the setting temperature is smaller than the reference value (indoor temperature is in a stable state), the air-conditioning controller may perform temperature correction that converts the detection temperature of the incar sensor into a temperature corresponding to the boarding zone (S16). Thereafter, the target discharge temperature may be calculated using the corrected temperature of the boarding zone, and then individual air-conditioning for temperature control of the selected boarding zone may be performed using the calculated target discharge temperature.

In this case, the corrected temperature, i.e., the temperature of the selected boarding zone can be expressed as Equation (2) below.

$$T_{ZONE}=T_{INCAR}+(T_{SET}-T_{INCAR})\times\eta_{x,ZONE} \qquad (2)$$

Here, $T_{ZONE}$, $T_{INCAR}$, $T_{SET}$, and $\eta_{x,ZONE}$ denote corrected temperature (temperature of boarding zone used in actual air-conditioning) of selected boarding zone, detection temperature (sensed value of incar sensor) of incar sensor, setting temperature, and mixing efficiency, respectively.

As shown in Equation (1), the detection temperature of the incar sensor may be corrected into the temperature corresponding to the selected boarding zone using a concept called "the mixing efficiency".

Here, the mixing efficiency is a coefficient (%) that is determined in proportion to a duration in which air discharged by the air-conditioning apparatus stays in the corresponding zone, and may be preset to a certain value according to each divided zone of the indoor space of a vehicle, the discharge mode, and the discharge air volume (air volume of the air-conditioning blower).

Air for air-conditioning discharged into each zone by the air-conditioning apparatus may not be completely mixed with air existing in the corresponding zone and then move to another zone, but may be mixed with air existing in the corresponding zone in proportion to a duration in which air stays in the corresponding zone and then remaining air may move to another zone.

Accordingly, a mixing ratio of air for air-conditioning discharged into the corresponding boarding zone and existing air may be changed according to the selected boarding zone, the discharge mode, and the air volume of the air-conditioning blower. The mixing ratio may be defined as the mixing efficiency, and may be used to correct the temperature of the corresponding boarding zone after the mixing efficiencies according to the selected boarding zone, the discharge mode, and the air volume of the air-conditioning blower are predefined.

The data form for obtaining the mixing efficiency from the boarding zone, the discharge mode, and the air volume of the air-conditioning blower may be a mixing efficiency map. The mixing efficiency map may be configured such that the mixing efficiency of the corresponding boarding zone can be calculated using the boarding zone, the discharge mode, and the supply voltage (value corresponding to the air volume of the air-conditioning blower) of the air-conditioning blower as an input.

Figure 6:
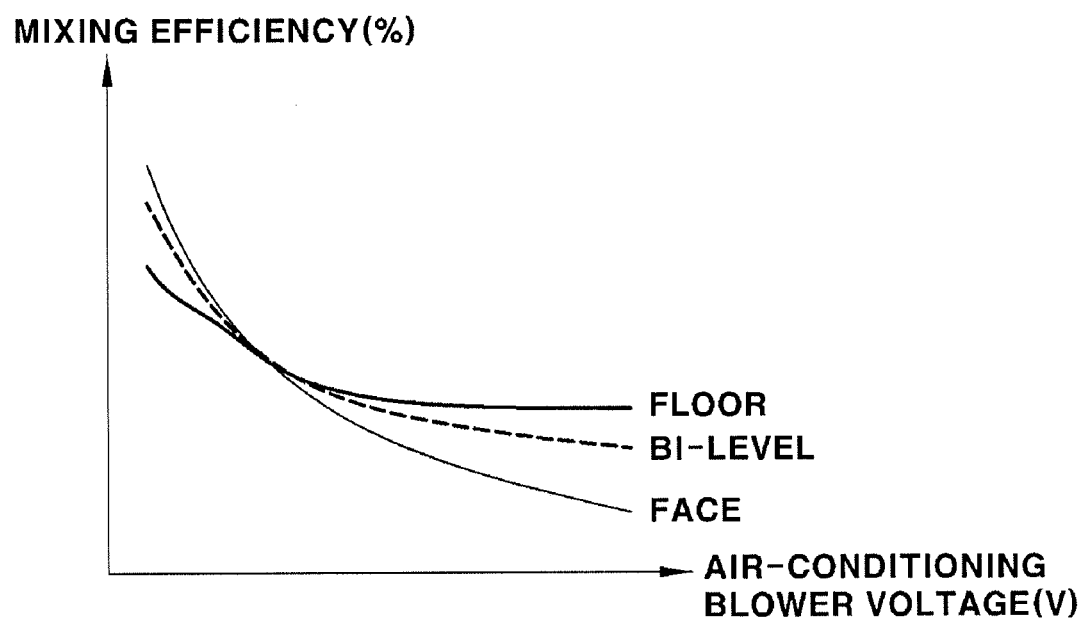
FIG. 6 is a view illustrating an exemplary mixing efficiency map that can be used upon selection of a specific boarding zone according to an exemplary embodiment of the present invention.

FIG. 6 is a view illustrating a mixing efficiency map usable in the selection of a specific boarding zone (e.g., driver's seat), which is provided with respect to the each of the driver's seat, the passenger's seat, and the rear seat, and is used to calculate the mixing efficiency in a corresponding zone.

In steps S11 and S12 of FIG. 5, when the number of the selected boarding zones is determined to be two, it is checked whether the selected boarding zones are the driver's seat and the passenger's seat (S12 and S13). Here, when the boarding zone are determined to be the driver's seat and the passenger's seat (the boarding zones are "driver's seat+passenger's seat"), the detection temperature of the incar sensor may be used as the temperature of the boarding zone without a correction to perform air-conditioning as described above (S15).

On the other hand, when the number of the selected boarding zones is two but the selected boarding zones are not the driver's seat and the passenger's seat, i.e., include the rear seat (the boarding zones are "driver's seat+rear seat" or "passenger's seat+rear seat"), priority may be given to the temperature of a seat (driver's seat or passenger's seat) in the first row, and the processes of steps S14, S15 and S16 may be performed similarly to the case where one boarding zone (driver's seat or passenger's seat) is selected.

When the difference between the detection temperature of the incar sensor and the setting temperature is equal to or greater than the reference value, the detection temperature of the incar sensor may be used without a correction to perform air-conditioning. However, when the difference between the detection temperature of the incar sensor and the setting temperature is smaller than the reference value, the first row may be selected as the boarding zone, and then the detection temperature of the incar sensor may be corrected to the temperature of the corresponding boarding zone based on Equation (1) using the mixing efficiency of the boarding zone in the first row (driver' seat and passenger's seat). Thus, the air-conditioning of the boarding zone may be performed using the corrected temperature.

Also, when the selected boarding zones are the whole zone including all of the driver's seat, the passenger's seat, and the rear seat, the detection temperature of the incar sensor may be used without a correction to perform the air-conditioning as described above.

Thus, since the air-conditioning control method includes a process of correcting a detection temperature of an incar sensor into the temperature of the boarding zone, effective temperature control can be performed on a selected boarding zone with only one incar sensor.

Also, this temperature correction may enable individual temperature control for each zone while performing air-conditioning on a plurality of boarding zones in a vehicle.

Thus, in an air-conditioning control method according to an exemplary embodiment of the present invention, since individual air-conditioning control is performed only on a boarding zone in which a passenger actually rides, there is an effect of increasing the driving distance of an electric vehicle by reducing the consumption of energy spent in unnecessary air-conditioning for indoor spaces except spaces occupied by passengers while providing and maintaining a comfort desired by a driver and a passenger as much as possible.

Also, since the air-conditioning control method includes a process of correcting a detection temperature of an incar sensor into the temperature of the boarding zone, effective temperature control can be performed on a selected boarding zone with only one incar sensor.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air-conditioning control method for dividing an indoor space of a vehicle into a plurality of zones to perform individual air-conditioning for each zone, the method comprising:
    selecting boarding zones occupied by passengers from the plurality of zones;
    checking whether the number of the boarding zones occupied by the passengers is one;
    correcting a detection temperature of an incar sensor into a temperature of one selected boarding zone using a mixing ratio of air for air-conditioning discharged from the one selected boarding zone with air existing in the one selected boarding zone when the number of the boarding zones occupied by the passengers is one; and
    performing individual air-conditioning on the selected boarding zones by determining a target discharge temperature based on the corrected temperature of the one selected boarding zone and using the determined target discharge temperature.

2. The air-conditioning control method of claim 1, wherein when a difference between the detection temperature of the incar sensor and an air-conditioning setting temperature set by a user is smaller than a predetermined reference value, the correcting of the detection temperature of the incar sensor and the performing of the individual air-conditioning are performed.

3. The air-conditioning control method of claim 2, wherein the difference between the detection temperature of the incar sensor and the air-conditioning setting temperature is equal to or greater than the predetermined reference value, a target discharge temperature is determined using the detection temperature of the incar sensor, and the individual air-conditioning is performed using the target discharge temperature determined from the detection temperature of the incar sensor.

4. The air-conditioning control method of claim 1, when the selected boarding zones include a rear seat in addition to one of a driver's seat and a passenger's seat in a first row boarding zone, further comprising:
    correcting the detection temperature of the incar sensor into a temperature of the one selected boarding zone using a mixing ratio of the first row boarding zone; and
    performing air-conditioning on the selected boarding zones by determining a target discharge temperature based on the corrected temperature of the one selected boarding zone using the mixing ratio of the first row boarding zone and using the determined target discharge temperature.

5. The air-conditioning control method of claim 4, wherein when a difference between the detection temperature of the incar sensor and an air-conditioning setting temperature set by a user is smaller than a predetermined reference value, the correcting of the detection temperature of the incar sensor using the mixing ratio of the first row boarding zone and the performing of air-conditioning on the selected boarding zones are performed.

6. The air-conditioning control method of claim 5, wherein when the difference between the detection temperature of the incar sensor and the air-conditioning setting temperature is equal to or greater than the predetermined reference value, the target discharge temperature is determined using the detection temperature of the incar sensor, and the air-conditioning on the one selected boarding zone is performed using the target discharge temperature determined from the detection temperature of the incar sensor.

7. The air-conditioning control method of claim 4, wherein when the selected boarding zones are all in the first row, the target discharge temperature is determined using the detection temperature of the incar sensor, and the air-conditioning on the one selected boarding zone is performed using the target discharge temperature determined from the detection temperature of the incar sensor.

8. The air-conditioning control method of claim 4, wherein the corrected temperature of the one selected boarding zone is determined from the detection temperature of the incar sensor, the air-conditioning setting temperature set by a user, and a mixing efficiency through an equation of $$T_{ZONE} = T_{INCAR} + (T_{SET} - T_{INCAR}) \times \eta_{X,ZONE}$$

where $T_{ZONE}$, $T_{INCAR}$, $T_{SET}$, and $\eta_{X,ZONE}$ denote the corrected temperature of the boarding zone, the detection temperature of the incar sensor, a setting temperature, and a mixing efficiency, respectively.

9. The air-conditioning control method of claim 8, wherein the mixing efficiency is defined as a value according to a discharge mode and a discharge air volume for each zone.

10. The air-conditioning control method of claim 1, wherein the corrected temperature of the one selected boarding zone is determined from the detection temperature of the incar sensor, the air-conditioning setting temperature set by a user, and a mixing efficiency through an equation of $$T_{ZONE} = T_{INCAR} + (T_{SET} - T_{INCAR}) \times \eta_{X,ZONE}$$

where $T_{ZONE}$, $T_{INCAR}$, $T_{SET}$, and $\eta_{X,ZONE}$ denote the corrected temperature of the boarding zone, the detection temperature of the incar sensor, a setting temperature, and a mixing efficiency, respectively.

11. The air-conditioning control method of claim 10, wherein the mixing efficiency is defined as a value according to a discharge mode and a discharge air volume for each zone.

12. The air-conditioning control method of claim 1, when a whole zone of the indoor space of the vehicle is the boarding zones occupied by passengers, further comprising performing air-conditioning on a whole boarding zone by determining a target discharge temperature using the detection temperature of the incar sensor and using the target discharge temperature determined from the detection temperature of the incar sensor.

* * * * *